(12) United States Patent
Zeng et al.

(10) Patent No.: US 10,204,586 B2
(45) Date of Patent: Feb. 12, 2019

(54) GATE DRIVER ON ARRAY (GOA) CIRCUITS AND LIQUID CRYSTAL DISPLAYS (LCDS)

(71) Applicant: Shenzhen China Star Optoelectronics Semiconductor Display Technology Co., Ltd., Shenzhen, Guangdong (CN)

(72) Inventors: Limei Zeng, Guangdong (CN); Shu-Jhih Chen, Guangdong (CN)

(73) Assignee: Shenzhen China Star Optoelectronics Semiconductor Display Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 15/739,692

(22) PCT Filed: Sep. 20, 2017

(86) PCT No.: PCT/CN2017/102354
§ 371 (c)(1),
(2) Date: Dec. 22, 2017

(65) Prior Publication Data
US 2019/0019470 A1 Jan. 17, 2019

(51) Int. Cl.
*G09G 3/36* (2006.01)
*G02F 1/1368* (2006.01)
*G02F 1/1345* (2006.01)

(52) U.S. Cl.
CPC ......... *G09G 3/3677* (2013.01); *G02F 1/1368* (2013.01); *G02F 1/13454* (2013.01); *G09G 2300/0809* (2013.01); *G09G 2310/0264* (2013.01); *G09G 2310/08* (2013.01)

(58) Field of Classification Search
CPC ............ G09G 3/3677; G09G 2310/08; G09G 2300/0809; G09G 2310/0264; G02F 1/13454; G02F 1/1368
See application file for complete search history.

(56) References Cited

U.S. PATENT DOCUMENTS

| 8,253,680 B2 | 8/2012 | Jang et al. |
| 9,343,032 B2 | 5/2016 | Dai |
| 9,570,026 B2 | 2/2017 | Dai |
| 2009/0278785 A1 | 11/2009 | Chin-Cheng |
| 2016/0293094 A1 | 10/2016 | Park et al. |
| 2018/0061347 A1 | 3/2018 | Zhang et al. |

FOREIGN PATENT DOCUMENTS

| CN | 106297719 A | 1/2017 |
| CN | 106448607 A | 2/2017 |
| CN | 106601205 A | 4/2017 |

*Primary Examiner* — Rodney Amadiz
(74) *Attorney, Agent, or Firm* — Andrew C. Cheng

(57) ABSTRACT

The present disclosure relates to a gate driver on array (GOA) circuit and a liquid crystal display (LCD). The GOA circuit includes a plurality of cascaded-connected GOA units connected, and the GOA unit at N-th level includes: a pull-up controlling module, a pull-up module, a down-transfer module, a bootstrap capacitor module, a pull-down maintaining module, a pull-down module and a controlling module. The controlling module respectively connects with the pull-down maintaining module and the adjacent GOA unit, and the controlling module is configured to accelerate a pull-down speed of the pull-down maintaining module by increasing a discharge path of the pull-down maintaining module on the GOA unit at the next level. As such, the response speed of the pull-down maintaining module may be improved, so as to improve the performance of the pull-down maintaining module.

20 Claims, 6 Drawing Sheets

GATE DRIVER ON ARRAY (GOA) CIRCUITS AND LIQUID CRYSTAL DISPLAYS (LCDS)

BACKGROUND

1. Technical Field

The present disclosure relates to liquid crystal panel display field, and more particularly to a gate driver on array (GOA) circuit and a liquid crystal display (LCD).

2. Description of Related Art

The horizontal scanning lines of the active LCD panels are mainly driven (gate drive) by the external integrated circuit (IC). The external IC is configured to supply the power to the corresponding gate line, such that the corresponding thin film transistor (TFT) may be turned on or turned off, so as to drive the horizontal scanning lines at each levels. The GOA technique is an array substrate driving technique that adopts the original manufacturing process of the LCD panels to configure the driving circuit of the horizontal scanning lines onto the non-display area of the substrate. Such that, the driving circuit may replace the external IC to drive the horizontal scanning lines. The GOA technique may reduce the bonding process of the external IC, improve the productivity, and reduce the costs.

The conventional GOA technique circuit may conduct the pull-down process on the pull-down maintaining module via the reverse device. However, the pull-down speed of the reverse device is slow, which may reduce the performance of the LCD.

SUMMARY

The present disclosure relates to a GOA circuit, including: a plurality of cascaded-connected GOA units, wherein the GOA unit at a N-th level includes: a pull-up controlling module, a pull-up module, a down-transfer module, a bootstrap capacitor module, a pull-down maintaining module, a pull-down module and a controlling module; wherein the pull-up controlling module is configured to receive level-transfer signals and scanning signals at a (N−2)-th level, and to output internal control signals at a gate signals point at the N-th level according to the level-transfer signals and the scanning signals at the (N−2)-th level; the pull-up module is configured to receive the internal control signals and clock signals, and to pull up the level-transfer signals at the N-th level according to the internal control signals and the clock signals; the down-transfer module is configured to receive the internal control signals and the clock signals, and to output the level-transfer signals at the N-th level according to the internal control signals and the clock signals; the bootstrap capacitor module is configured to pull up a high potential of the internal control signals; the pull-down maintaining module is configured to receive the internal control signals, external control signals, first low level-transfer signals, and the second low level-transfer signals, and to maintain a low level of the scanning signals at the N-th level according to the internal control signals, the external control signals, the first low level-transfer signals, and the second low level-transfer signals; the pull-down module is configured to receive the internal control signals, the first low level-transfer signals, the second low level-transfer signals, and the scanning signals at (N+2)-th level, and to pull down the scanning signals at the N-th level according to the internal control signals, the first low level-transfer signals, the second low level-transfer signals, and the scanning signals at (N+2)-th level; the controlling module connects with the pull-down maintaining module and the adjacent GOA unit respectively, and the controlling module is configured to accelerate a pull-down speed of the pull-down maintaining module by increasing a discharge path of the pull-down maintaining module via the adjacent GOA unit; the pull-down maintaining module includes: a sixth transistor, a seventh transistor, an eighth transistor, a ninth transistor, a tenth transistor, and an eleventh transistor; wherein a first end and a second end of the sixth transistor electrically connect with a second end of the eighth transistor to receive the external control signals, a third end of the sixth transistor electrically connects with a second end of the seventh transistor and a first end of the eighth transistor respectively, a first end of the seventh transistor electrically connects with a first end of the ninth transistor to receive the internal control signals, a third end of the eighth transistor respectively connects with a second end of the ninth transistor, a first end of the tenth transistor, and a first end of the eleventh transistor, a second end of the tenth transistor electrically connects with the scanning signals at the N-th level, a second end of the eleventh transistor electrically connects with the gate signals point at the level. a third end of the seventh transistor and a third end of the eleventh transistor electrically connects with the first low level-transfer signals, a third end of ninth transistor and a third end of the tenth transistor electrically connect with the second low level-transfer signals; the controlling module includes a twelfth transistor, wherein a first end of the twelfth transistor electrically connects with the gate signals point at the N-th level after connecting with a gate of the twelfth transistor of the GOA unit adjacent to the twelfth transistor, a second end of the twelfth transistor electrically connects with a third end of the sixth transistor, a third end of the twelfth transistor electrically connects with the first low level-transfer signals, wherein an absolute value of the first low level-transfer signals is greater than an absolute value of the second low level-transfer signals; the pull-up controlling module includes a first transistor, wherein a first end of the first transistor is configured to receive the level-transfer signals at the (N−2)-th level, a second end of the first transistor is configured to receive the scanning signals at the (N−2)-th level, a third end of the first transistor electrically connects with the gate signals point at the N-th level to transmit the internal controlling signals to the gate signals point at the N-th level.

In another aspect, the present disclosure relates to a GOA circuit of LCDs, including: a plurality of cascaded-connected GOA units, wherein the GOA unit at a N-th level includes: a pull-up controlling module, a pull-up module, a down-transfer module, a bootstrap capacitor module, a pull-down maintaining module, a pull-down module and a controlling module; wherein the pull-up controlling module is configured to receive level-transfer signals and scanning signals at a (N−2)-th level, and to output internal control signals at a gate signals point at the N-th level according to the level-transfer signals and the scanning signals at the (N−2)-th level; the pull-up module is configured to receive the internal control signals and clock signals, and to pull up the level-transfer signals at the N-th level according to the internal control signals and the clock signals; the down-transfer module is configured to receive the internal control signals and the clock signals, and to output the level-transfer signals at the N-th level according to the internal control signals and the clock signals; the bootstrap capacitor module is configured to pull up a high potential of the internal control signals; the pull-down maintaining module is configured to receive the internal control signals, external control signals, first low level-transfer signals, and the second low level-transfer signals, and to maintain a low level of the scanning signals at the N-th level according to the internal control signals, the external control signals, the first low level-transfer signals, and the second low level-transfer signals; the pull-down module is configured to receive the internal control signals, the first low level-transfer signals, the second low level-transfer signals, and the scanning signals at (N+2)-th level, and to pull down the scanning signals at the N-th level according to the internal control signals, the first low level-transfer signals, the second low level-transfer signals, and the scanning signals at (N+2)-th level; the controlling module connects with the pull-down maintaining module and the adjacent GOA unit respectively, and the controlling module is configured to accelerate a pull-down speed of the pull-down maintaining module by increasing a discharge path of the pull-down maintaining module via the adjacent GOA unit.

In another aspect, the present disclosure relates to a LCD, including: a GOA circuit configured with a plurality of cascaded-connected GOA units, wherein the GOA unit at a N-th level includes: a pull-up controlling module, a pull-up module, a down-transfer module, a bootstrap capacitor module, a pull-down maintaining module, a pull-down module and a controlling module; wherein the pull-up controlling module is configured to receive level-transfer signals and scanning signals at a (N−2)-th level, and to output internal control signals at a gate signals point at the N-th level according to the level-transfer signals and the scanning signals at the (N−2)-th level; the pull-up module is configured to receive the internal control signals and clock signals, and to pull up the scanning signals at the N-th level according to the internal control signals and the clock signals; the down-transfer module is configured to receive the internal control signals and the clock signals, and to output the level-transfer signals at the N-th level according to the internal control signals and the clock signals; the bootstrap capacitor module is configured to pull up a high potential of the internal control signals; the pull-down maintaining module is configured to receive the internal control signals, external control signals, first low level signals, and second low level signals, and to maintain a low level of the scanning signals at the N-th level according to the internal control signals, the external control signals, the first low level signals, and the second low level signals; the pull-down module is configured to receive the internal control signals, the first low level signals, the second low level signals, and scanning signals at (N+2)-th level, and to pull down the scanning signals at the N-th level according to the internal control signals, the first low level signals, the second low level signals, and the scanning signals at (N+2)-th level; the controlling module connects with the pull-down maintaining module and the adjacent GOA unit respectively, and the controlling module is configured to accelerate a pull-down speed of the pull-down maintaining module by increasing a discharge path of the pull-down maintaining module via the adjacent GOA unit.

In view of the above, the present disclosure relates to the GOA circuit and the LCD, which include a plurality of cascaded GOA units. The GOA unit at the N-th level may include: the pull-up controlling module configured to receive the level-transfer signals and the scanning signals at the (N−2)-th level, to output the internal control signals at the gate signals point at the N-th level according to the level-transfer signals and the scanning signals at the (N−2)-th level. The GOA unit at the N-th level may further include the pull-up module configured to receive the internal control signals and the clock signals, and to pull up the level signal at the N-th level according to the internal control signals and the clock signals. The GOA unit at the N-th level may further include: the down-transfer module configured to receive the internal control signals and the clock signals and to output the level-transfer signals at the N-th level, the bootstrap capacitor module configured to pull up the level of the internal control signals, the pull-down maintaining module configured to receive the internal control signals, the external control signals, the first low level signals, and the second low level signals, and to maintain the scanning signals at the N-th level at low level according to the internal control signals, the external control signals, the first low level signals, and the second low level signals. The GOA unit at the N-th level may further include: the pull-down module configured to receive the internal control signals, the first low level signals, the second low level signals, and the scanning signals at (N+2)-th level, and to pull down the scanning signals at the N-th level according to the internal control signals, the first low level signals, the second low level signals, and the scanning signals at (N+2)-th level, the controlling module connecting with the pull-down maintaining module and the GOA unit at next level respectively, wherein the controlling module is configured to accelerate the pull-down speed of the pull-down maintaining module by increasing the discharge path of the pull-down maintaining module on the GOA unit at the next level. As such, the response speed of the pull-down maintaining module may be improved, so as to improve the performance of the pull-down maintaining module.

DETAILED DESCRIPTION

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments.

Figure 1:
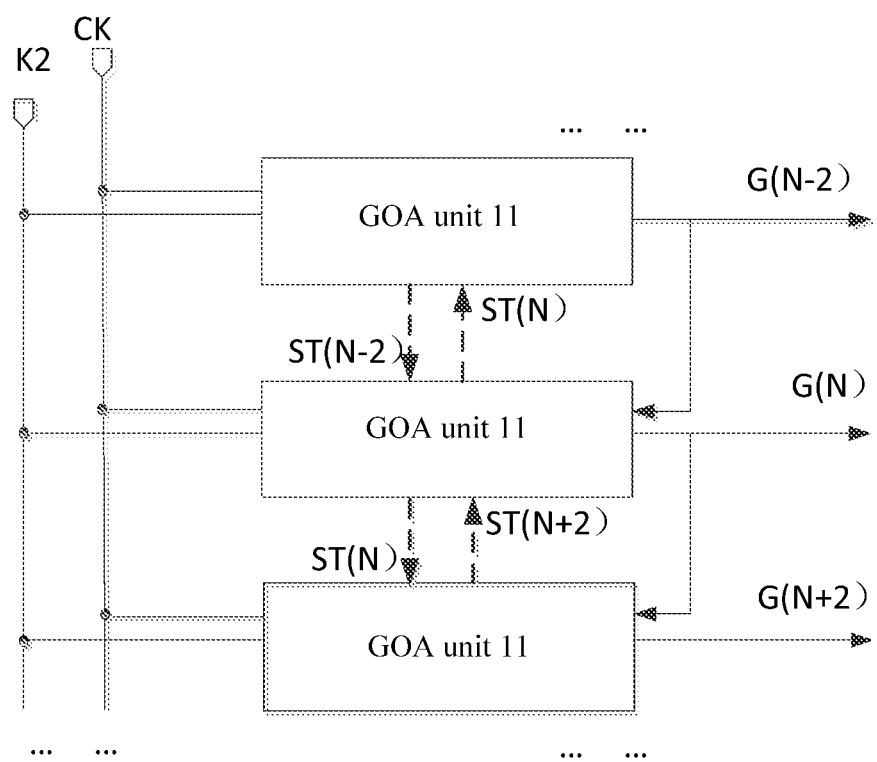
FIG. 1 is a schematic view of a GOA circuit in accordance with one embodiment of the present disclosure.

FIG. 1 is a schematic view of a GOA circuit in accordance with one embodiment of the present disclosure. As shown in FIG. 1, the GOA circuit 10 includes a plurality of cascaded-connected GOA units 11.

Wherein the GOA unit 11 at a N-th level is configured to output scanning signals G(N) to charge a corresponding horizontal scanning line at the N-th level when being controlled by clock signals CK, level-transfer signals at a (N−2)-th level ST(N−2), scanning signals at a (N+2)-th level G(N+2), scanning signals at a (N−2)-th level G(N−2), and external controlling signals K2. In one example, the GOA circuit may be an indium gallium zinc oxide (IGZO) thin film transistor (TFT).

Figure 2:
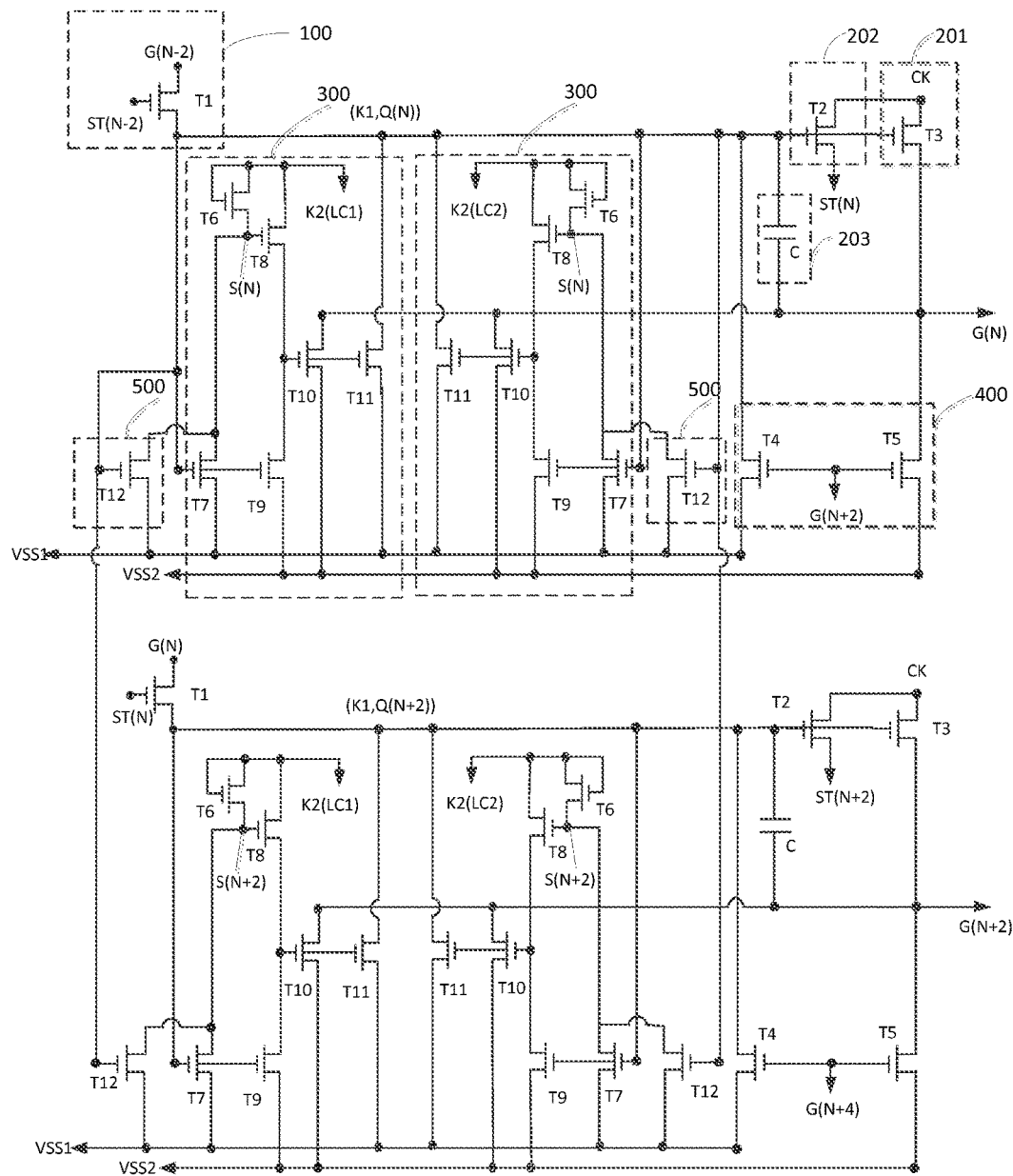
FIG. 2 is a circuit schematic diagram of the GOA circuit shown in FIG. 1 in accordance with a first embodiment of the present disclosure.

As shown in FIG. 2, the GOA unit 11 at the N-th level includes: a pull-up controlling module 100, a pull-up module 201, a down-transfer module 202, a bootstrap capacitor module 203, a pull-down maintaining module 300, a pull-down module 400 and a controlling module 500.

The pull-up controlling module 100 is configured to receive the level-transfer signals at (N−2)-th level ST(N−2) and scanning signals at a (N−2)-th level G(N−2), and to output internal control signals K1 at a gate signals point at the N-th level Q(N) according to the level-transfer signals at the ST(N−2) and the scanning signals at the (N−2)-th level G(N−2).

The pull-up module 201 is configured to receive the internal control signals K1 and the clock signals CK, and to pull up the scanning signals at the N-th level G(N) according to the internal control signals K1 and the clock signal CK.

The down-transfer module 202 is configured to receive the internal control signals K1 and the clock signals CK, and to output the level-transfer signals at the N-th level ST(N) according to the internal control signals K1 and the clock signal CK.

The bootstrap capacitor module 203 is configured to pull up a high potential of the internal control signals K1.

The pull-down maintaining module 300 is configured to receive the internal control signals K1, the external control signals K2, first low level signals VSS1, and second low level signals VSS2, and to maintain a low level of the scanning signals at the N-th level G(N) according to the internal control signals K1, the external control signals K2, the first low level signals VSS1, and the second low level signals VSS2.

The pull-down module 400 is configured to receive the internal control signals K1, the first low level signals VSS1, the second low level signals VSS2, and the scanning signals at (N+2)-th level ST(N+2), and to pull down the scanning signals at the N-th level G(N) according to the internal control signals K1, the first low level signals VSS1, the second low level signals VSS2, and the scanning signals at (N+2)-th level G(N+2).

The controlling module 500 connects with the pull-down maintaining module 300 and the adjacent GOA unit respectively, and the controlling module 200 is configured to accelerate a pull-down speed of the pull-down maintaining module 300 by increasing a discharge path of the pull-down maintaining module 300 via the adjacent GOA unit.

Specifically, the pull-up controlling module 100 includes a first transistor T1, wherein a first end of the first transistor T1 is configured to receive the level-transfer signals at the (N−2)-th level ST(N−2). A second end of the first transistor T1 is configured to receive the scanning signals at the (N−2)-th level G(N−2). A third end of the first transistor T1 electrically connects with the gate signals point at the N-th level Q(N) to transmit the internal controlling signals K1 to the gate signals point at the N-th level Q(N).

The pull-up module 201 includes a third transistor T3. The down-transfer module 202 includes a second transistor T2. The bootstrap capacitor module 203 includes a capacitor C.

Wherein the second transistor T2 is configured to receive the internal control signals K1 after connecting with a first end of the third transistor T3. The second transistor T2 is configured to receive the clock signals CK after connecting with a second end of the third transistor T3. A third end of the second transistor T2 is configured to output the level-transfer signals at the N-th level ST(N) and connects with the scanning signals at the N-th level G(N). Two sides of the capacitor C electrically connect with the first end of the second transistor T2 and the third end of the third transistor T3.

The pull-down maintaining module 300 includes: a sixth transistor T6, a seventh transistor T7, an eighth transistor T8, a ninth transistor T9, a tenth transistor T10, and an eleventh transistor T11. Wherein a first end and a second end of the sixth transistor T6 electrically connect with a second end of the eighth transistor T8 to receive the external control signals K2. A third end of the sixth transistor T6 electrically connects with a second end of the seventh transistor T7 and a first end of the eighth transistor T8 respectively. A first end of the seventh transistor T7 electrically connects with a first end of the ninth transistor T9 to receive the internal control signals K1. A third end of the eighth transistor T8 respectively connects with a second end of the ninth transistor T9, a first end of the tenth transistor T10, and a first end of the eleventh transistor T11. A second end of the tenth transistor T10 electrically connects with the scanning signals at the N-th level G(N). A second end of the eleventh transistor T11 electrically connects with the gate signals point at the N-th level. A third end of the seventh transistor T7 and a third end of the eleventh transistor T11 electrically connects with the first low level signals VSS1. A third end of ninth transistor T9 and a third end of the tenth transistor T10 electrically connect with the second low level signals VSS2.

Person skilled in the art may understand the pull-down maintaining module 300 may include a reverse device. An input end of the reverse device is configured to be the gate signals point at n-th level Q(N). An output end of the reverse device is configured to be a common connecting end of the tenth transistor T10, the eighth transistor T8, and the ninth transistor T9.

The pull-down module 400 includes a fourth transistor T4 and a fifth transistor T5. The fourth transistor T5 is configured to receive the scanning signals at (N+2)-th level G(N−2) after electrically connecting with a first end of the fifth transistor T5. A second end of the fourth transistor T4 is configured to receive the internal controlling signals K1. A second end of the fifth transistor T5 connects with scanning signals at the N-th level G(N). A third end of the fourth transistor T4 electrically connects with the first low level signals VSS1, and a third end of the fifth transistor electrically connects with the second low level signals VSS2.

The controlling module 500 includes a twelfth transistor T12. A first end of the twelfth transistor T12 electrically connects with the gate signals point at the N-th level after connecting with a first end of the twelfth transistor T12 of the GOA unit at the (N+2) level. A second end of the twelfth transistor T12 electrically connects with a third end of the sixth transistor T6. A third end of the twelfth transistor T12 electrically connects with the first low level signals VSS1. Wherein a common node of the second end of the twelfth transistor T12 and the third end of the sixth transistor T6 is configured to be a pull-down node S(N).

In one example, the GOA circuit 11 may include two pull-down maintaining modules 300 and two controlling modules 500. One of the external controlling signals K2 of the two pull-down maintaining module 300 are configured to be first low frequency signals LC1. The other one of the external controlling signals K2 of the two pull-down maintaining module 300 are configured to be second low frequency signals LC2. Wherein the first low frequency signals LC1 and the second low frequency signals LC2 are inversed to each other.

In one example, an absolute value of the first low level signals VSS1 is greater than an absolute value of the second low level signals VSS2.

In one example, the twelfth transistor T12 is introduced and the first end of the twelfth transistor T12 connects with the gate signals point at the N-th level Q(N) after connecting with the first end of the twelfth transistor T12 within the adjacent GOA unit, so as to pull-down the pull-down node S(N) better. As such, the response speed of the pull-down maintaining module may be improved, so as to improve the performance of the pull-down maintaining module. In the pull-down maintaining module 300, the transistor connected with the gate signals at the N-th level Q(N), i.e. the seventh transistor T7 and the eleventh transistor T11, are pulled down to the first low level signals VSS1, and the ninth transistor T9 and the tenth transistor T10 are pulled down to the second low level signals VSS2. In additional, the absolute value of the first low level signals VSS1 is greater than the absolute value of the second low level signals VSS2, such that, the pull-down speed of the pull-down maintaining module 300 is further increased.

Figure 3:
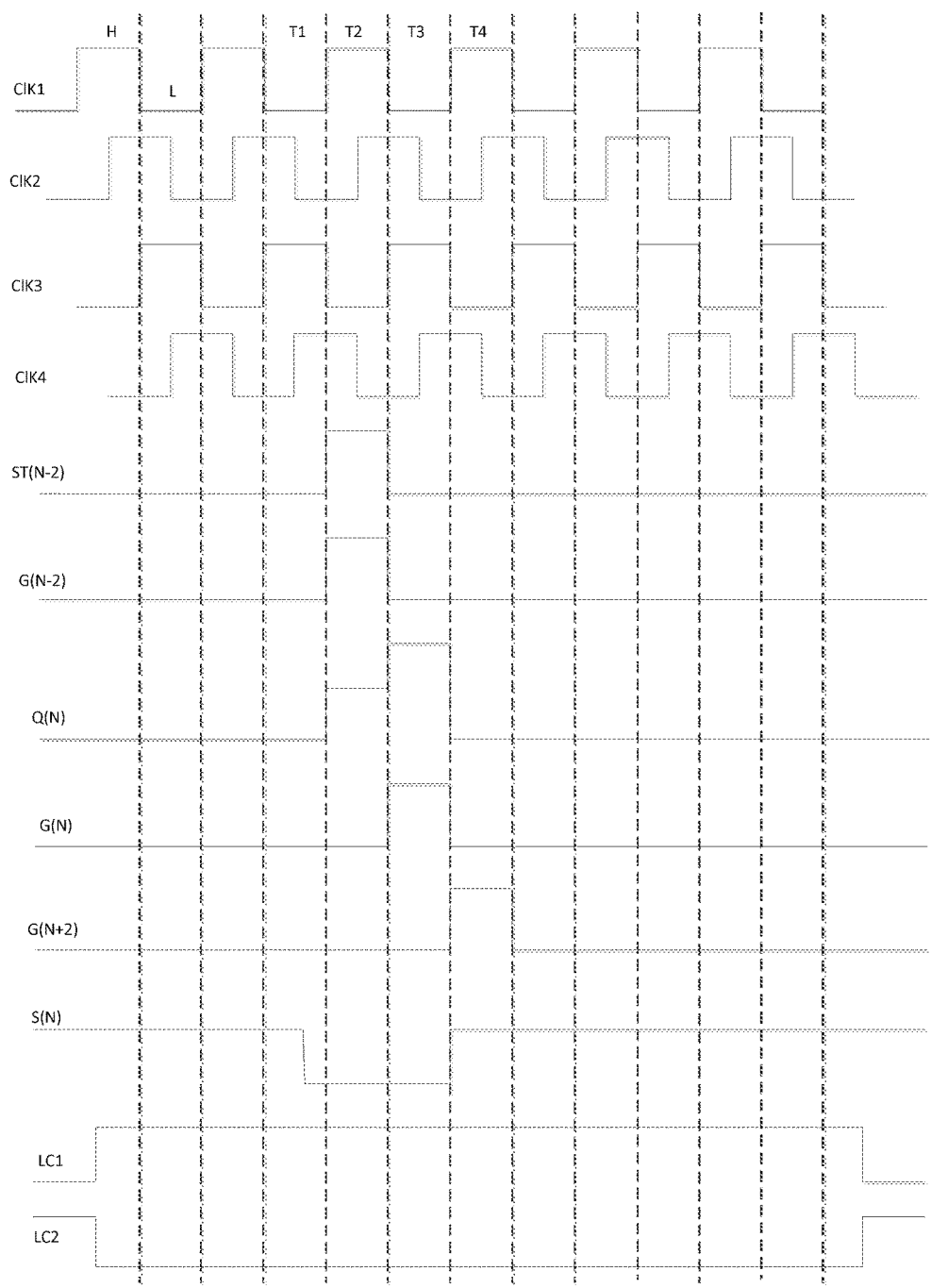
FIG. 3 is an operation timing diagram of the GOA circuit shown in FIG. 2.

Referring to FIG. 3, "H" indicates a high potential and "L" indicates a low potential. The clock signals may include four types of clock signals conducted on the four adjacent GOA units in sequence. The four types of the clock signals include a first clock signals CLK1, a second clock signals CLK2, a third clock signals CLK3, and a fourth clock signals CLK4. When the clock signals CK are configured to be the first clock signals CLK1 and the third clock signals CLK3, the clock signals may be conducted on the GOA units at odd number of levels. When the clock signals CK are configured to be the second clock signals CLK2 and the fourth clock signals CLK4, the clock signals may be conducted on the GOA units at even number of levels. The operation timing diagram is an example illustrating the GOA unit having the clock signals CK configured to be the third clock signals CLK3.

During a time period T1, the third clock signals CLK3 are configured to be at the high potential, and the level-transfer signals at the (N−2)-th level ST(N−2) and the scanning signals at the (N−2)-th level G(N−2) are configured to be at the low potential. The first thin film transistor (TFT) T1 is turned off. The gate signals point at the N-th level G(N) is at the low potential. The pull-up module 201 is disconnected. The scanning signals at the N-th level G(N) output the low level signals.

During a time period T2, the third clock signals CLK3 are configured to be at the low potential, and the level-transfer signals at the (N−2)-th level ST(N−2) and the scanning signals at the (N−2)-th level G(N−2) are configured to be at the high potential. The first TFT T1 is turned on. The gate signals point at the N-th level G(N) is at the high potential. The capacity C is charged. The second TFT T2 connects with the third TFT T3. The third clock signals are configured to be at the low potential, so that the scanning signals at N-th level G(N) output the low level signals.

During a time period T3, the third clock signals T3 are configured to be at the high level. Gate voltage of the second TFT T2 and the third TFT T3 are raised to a higher level due to the charged capacity C. The third clock signals T3 are configured to be at the high level, so that the scanning signals at N-th level G(N) output the high level signals.

During a time period T4, the third clock signals T3 are configured to be at the low level, and the level-transfer signals at (N−2)-th level ST(N−2) are configured to be at the high potential. The pull-down module 400 is configured to pull down voltage of the gate signals point at the N-th level Q(N), as such the scanning signals at the N-th level G(N) may output the low level signals.

The person skilled in the art may understand, of the GOA unit excludes the controlling module 500, and the gate signals point Q(N) is at the high potential, the pull-down node S(N) may be configured to be at the low potential correspondingly. In one example, as shown in FIG. 3, the GOA unit includes the controlling module 500, the pull-down node S(N) turns into the low potential before the gate signals point Q(N) at the N-th level turns into the high potential. As such, the response speed of the pull-down maintaining module may be improved, so as to improve the performance of the pull-down maintaining module.

Figure 4:
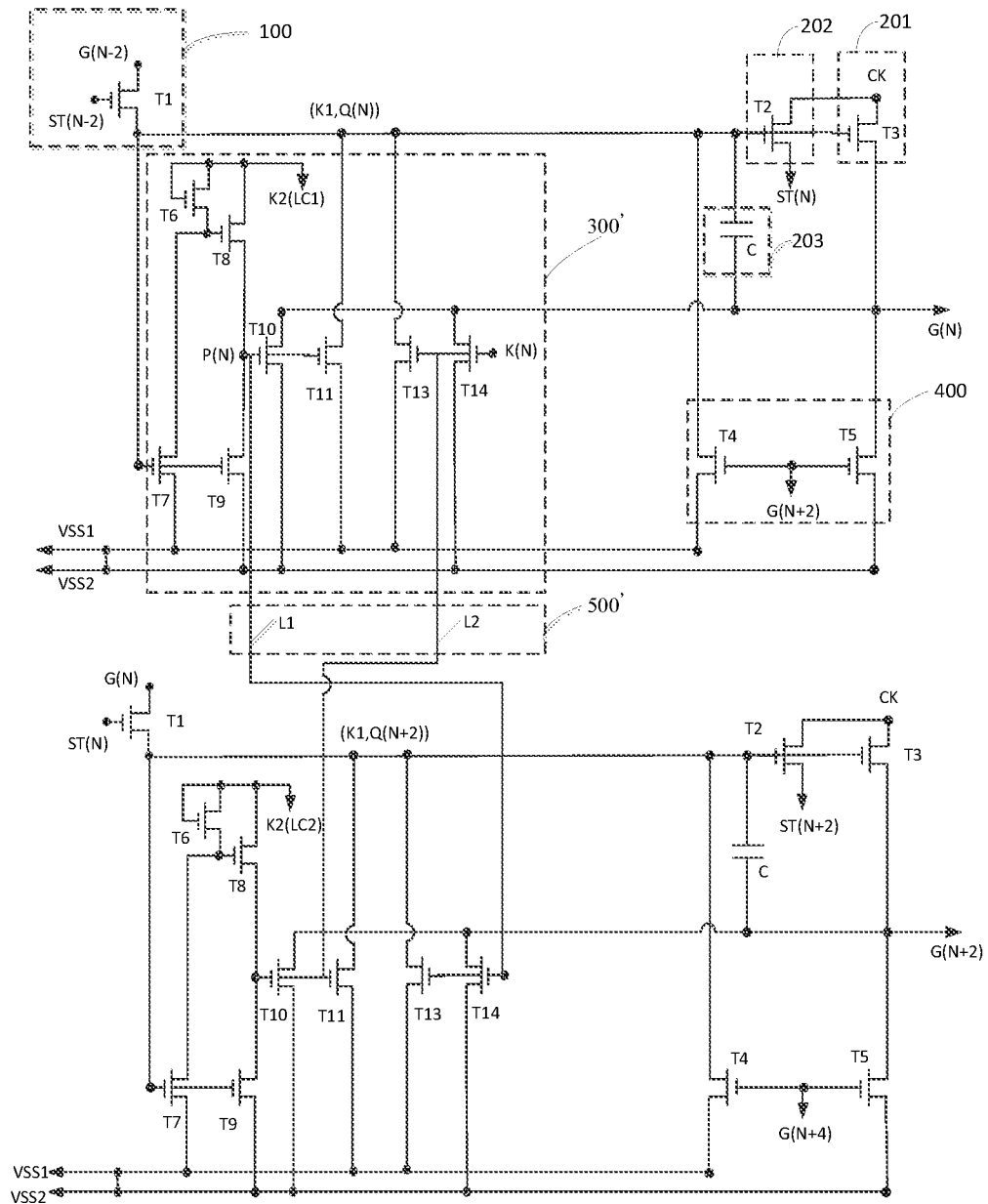
FIG. 4 is a circuit schematic diagram of the GOA circuit shown in FIG. 1 in accordance with a second embodiment of the present disclosure.

As shown in FIG. 4, the difference between the embodiment shown in FIG. 4 and the embodiment shown in FIG. 2 resides in that the GOA unis shown in FIG. 4 includes only one pull-down maintaining module 300'. Wherein the pull-down maintaining module 300' may further include a thirteenth transistor T13 and a fourteenth transistor T14. The thirteenth transistor T13 electrically connects with a first end of the fourteenth transistor T14. A second end of the thirteenth transistor T13 electrically connects with the gate signals point at the N-th level Q(N). A second end of the fourteenth transistor T14 electrically connects with the second end of the tenth transistor T10. The thirteenth transistor T13 and a third end of the fourteenth transistor T14 electrically connect the first low level signals VSS1 or the second low level signals VSS2.

In one example, the first low level signals VSS1 may electrically connect with the second low level signals VSS2. That is, the first low level signals VSS1 and the second low level signals VSS2 are configured to be the same low level signals.

In another example, the controlling module 500' may include a first connecting line L1 and a second connecting line L2. One end of the first controlling line L1 connects with the first end of the tenth transistor T10 in the pull-down maintaining module 300', the other end of the first controlling line L1 connects with the first end of the fourteenth transistor T14 within the GOA unit at the (N+2)-th level. One end of the second connecting line L2 connects with the first end of the thirteenth transistor T13 in the pull-down maintaining module 300', the other end of the second controlling line L2 connects with the first end of the eleventh transistor T11 within the GOA unit at the (N+2)-th level.

That is, the two GOA units, i.e. the GOA unit at the N-th level and the GOA unit at the (N+2)-th level, share the one controlling module 500'.

In another example, the external controlling signals K2 of the pull-down maintaining module 300' in the GOA unit at the N-th level are configured to be the first low frequency signals LC1, and the external controlling signals K2 of the pull-down maintaining module 300' in the GOA unit at the (N+2)-th level are configured to be the second low frequency signals LC2. Wherein the first low frequency signals LC1 and the second low frequency signals LC2 are in inversed to each other.

In another example, the first connecting line L1 and the second connecting line L2 are introduced, a pull-down transistor of the GOA unit at the N-th level, i.e. the tenth transistor T10 and the thirteenth transistor T13 directly connect with the pull-down transistor of the GOA unit at next level, that is the GOA unit at the (N+2)-th level, wherein the pull-down transistor of the GOA unit at the (N+2)-th level are the fourteenth transistor T14 and the eleventh transistor T11. As such, the eighth transistor T8 may stay at a turned-on state, so as to increase the pull-down speed of the pull-down maintaining module 300'.

Figure 5:
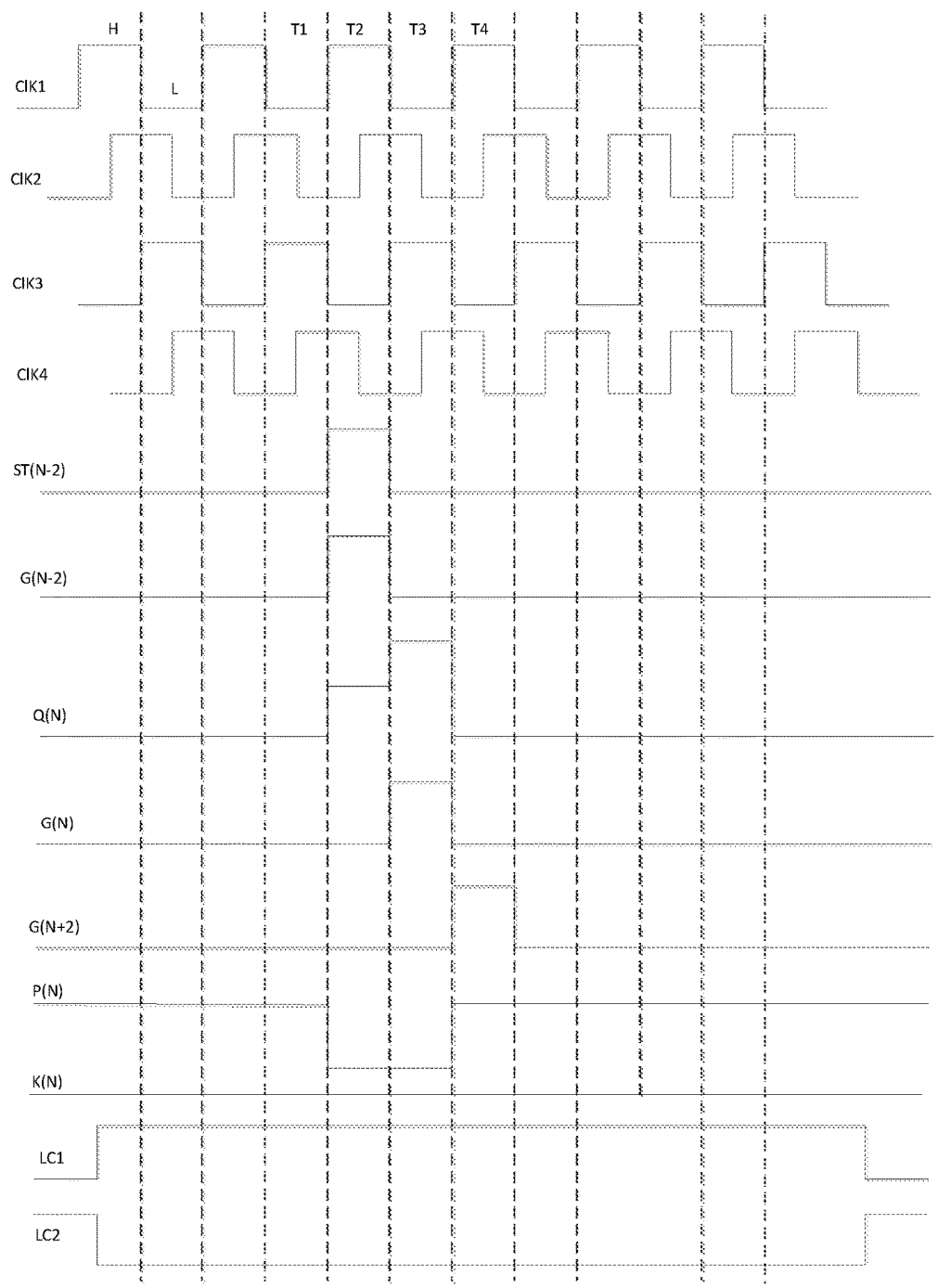
FIG. 5 is an operation timing diagram of the GOA circuit shown in FIG. 4.

Referring to FIG. 5, the difference between the operation timing shown in FIG. 5 and the operation timing shown in FIG. 3 resides in that the first end P(N) of the tenth transistor T10 at the time period T2 and time period T3 is the low level signals, and the first end P(N) of the tenth transistor T10 may be the high level signals in other time periods. The first end K(N) of the fourteenth transistor T14 is the high level signals.

The operation timing of other signal lines is similar to FIG. 3, and may not be described again.

Figure 6:
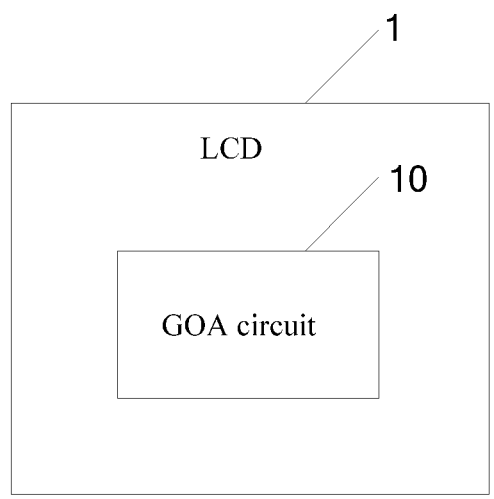
FIG. 6 is a schematic view of a LCD in accordance with one embodiment of the present disclosure.

Referring to FIG. 6, a liquid crystal display (LCD) includes the GOA circuit 10.

In view of the above, the present disclosure relates to the GOA circuit and the LCD, which include a plurality of cascaded GOA units. The GOA unit at the N-th level may include: the pull-up controlling module configured to receive the level-transfer signals and the scanning signals at the (N−2)-th level, to output the internal control signals at the gate signals point at the N-th level according to the level-transfer signals and the scanning signals at the (N−2)-th level. The GOA unit at the N-th level may further include the pull-up module configured to receive the internal control signals and the clock signals, and to pull up the level signal at the N-th level according to the internal control signals and the clock signals. The GOA unit at the N-th level may further include: the down-transfer module configured to receive the internal control signals and the clock signals and to output the level-transfer signals at the N-th level, the bootstrap capacitor module configured to pull up the level of the internal control signals, the pull-down maintaining module configured to receive the internal control signals, the external control signals, the first low level signals, and the second low level signals, and to maintain the scanning signals at the N-th level at low level according to the internal control signals, the external control signals, the first low level signals, and the second low level signals. The GOA unit at the N-th level may further include: the pull-down module configured to receive the internal control signals, the first low level signals, the second low level signals, and the scanning signals at (N+2)-th level, and to pull down the scanning signals at the N-th level according to the internal control signals, the first low level signals, the second low level signals, and the scanning signals at (N+2)-th level, the controlling module connecting with the pull-down maintaining module and the GOA unit at next level respectively, wherein the controlling module is configured to accelerate the pull-down speed of the pull-down maintaining module by increasing the discharge path of the pull-down maintaining module on the GOA unit at the next level. As such, the response speed of the pull-down maintaining module may be improved, so as to improve the performance of the pull-down maintaining module.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A gate driver on array (GOA) circuit of liquid crystal displays (LCDs), comprising:
    a plurality of cascaded-connected GOA units, wherein the GOA unit at a N-th level comprises: a pull-up controlling module, a pull-up module, a down-transfer module, a bootstrap capacitor module, a pull-down maintaining module, a pull-down module and a controlling module;
    wherein the pull-up controlling module is configured to receive level-transfer signals and scanning signals at a (N−2)-th level, and to output internal control signals at a gate signals point at the N-th level according to the level-transfer signals and the scanning signals at the (N−2)-th level;
    the pull-up module is configured to receive the internal control signals and clock signals, and to pull up the scanning signals at the N-th level according to the internal control signals and the clock signals;
    the down-transfer module is configured to receive the internal control signals and the clock signals, and to output the level-transfer signals at the N-th level according to the internal control signals and the clock signals;
    the bootstrap capacitor module is configured to pull up a high potential of the internal control signals;
    the pull-down maintaining module is configured to receive the internal control signals, external control signals, first low level signals, and second low level signals, and to maintain a low level of the scanning signals at the N-th level according to the internal control signals, the external control signals, the first low level signals, and the second low level signals;
    the pull-down module is configured to receive the internal control signals, the first low level signals, the second low level signals, and scanning signals at (N+2)-th level, and to pull down the scanning signals at the N-th level according to the internal control signals, the first low level-transfer signals, the second low level-transfer signals, and the scanning signals at (N+2)-th level;
    the controlling module connects with the pull-down maintaining module and the adjacent GOA unit respectively, and the controlling module is configured to accelerate a pull-down speed of the pull-down maintaining module by increasing a discharge path of the pull-down maintaining module via the adjacent GOA unit;
    the pull-down maintaining module comprises: a sixth transistor, a seventh transistor, an eighth transistor, a ninth transistor, a tenth transistor, and an eleventh transistor;
    wherein a first end and a second end of the sixth transistor electrically connect with a second end of the eighth transistor to receive the external control signals, a third end of the sixth transistor electrically connects with a second end of the seventh transistor and a first end of the eighth transistor respectively, a first end of the seventh transistor electrically connects with a first end of the ninth transistor to receive the internal control signals, a third end of the eighth transistor respectively connects with a second end of the ninth transistor, a first end of the tenth transistor, and a first end of the eleventh transistor, a second end of the tenth transistor electrically connects with the scanning signals at the N-th level, a second end of the eleventh transistor electrically connects with the gate signals point at the N-th level, a third end of the seventh transistor and a third end of the eleventh transistor electrically connects with the first low level signals, a third end of ninth transistor and a third end of the tenth transistor electrically connect with the second low level signals;
    the controlling module comprises a twelfth transistor, wherein a first end of the twelfth transistor electrically connects with the gate signals point at the N-th level after connecting with a gate of the twelfth transistor of the GOA unit adjacent to the twelfth transistor, a second end of the twelfth transistor electrically connects with a third end of the sixth transistor, a third end of the twelfth transistor electrically connects with the first low level signals, wherein an absolute value of the first low level signals is greater than an absolute value of the second low level signals;

the pull-up controlling module comprises a first transistor, wherein a first end of the first transistor is configured to receive the level-transfer signals at the (N−2)-th level, a second end of the first transistor is configured to receive the scanning signals at the (N−2)-th level, a third end of the first transistor electrically connects with the gate signals point at the N-th level to transmit the internal controlling signals to the gate signals point at the N-th level.

2. The GOA circuit according to claim 1, wherein the GOA circuit comprises two pull-down maintaining modules and two controlling modules, one of the external controlling signals of the two pull-down maintaining module are configured to be first low frequency signals, the other one of the external controlling signals of the two pull-down maintaining module are configured to be second low frequency signals.

3. A GOA circuit of LCDs, comprising:
a plurality of cascaded-connected GOA units, wherein the GOA unit at a N-th level comprises: a pull-up controlling module, a pull-up module, a down-transfer module, a bootstrap capacitor module, a pull-down maintaining module, a pull-down module and a controlling module;
wherein the pull-up controlling module is configured to receive level-transfer signals and scanning signals at a (N−2)-th level, and to output internal control signals at a gate signals point at the N-th level according to the level-transfer signals and the scanning signals at the (N−2)-th level;
the pull-up module is configured to receive the internal control signals and clock signals, and to pull up the scanning signals at the N-th level according to the internal control signals and the clock signals;
the down-transfer module is configured to receive the internal control signals and the clock signals, and to output the level-transfer signals at the N-th level according to the internal control signals and the clock signals;
the bootstrap capacitor module is configured to pull up a high potential of the internal control signals;
the pull-down maintaining module is configured to receive the internal control signals, external control signals, first low level signals, and second low level signals, and to maintain a low level of the scanning signals at the N-th level according to the internal control signals, the external control signals, the first low level signals, and the second low level signals;
the pull-down module is configured to receive the internal control signals, the first low level signals, the second low level signals, and scanning signals at (N+2)-th level, and to pull down the scanning signals at the N-th level according to the internal control signals, the first low level-transfer signals, the second low level-transfer signals, and the scanning signals at (N+2)-th level;
the controlling module connects with the pull-down maintaining module and the adjacent GOA unit respectively, and the controlling module is configured to accelerate a pull-down speed of the pull-down maintaining module by increasing a discharge path of the pull-down maintaining module via the adjacent GOA unit.

4. The GOA circuit according to claim 3, wherein the pull-down maintaining module comprises: a sixth transistor, a seventh transistor, an eighth transistor, a ninth transistor, a tenth transistor, and an eleventh transistor;
wherein a first end and a second end of the sixth transistor electrically connect with a second end of the eighth transistor to receive the external control signals, a third end of the sixth transistor electrically connects with a second end of the seventh transistor and a first end of the eighth transistor respectively, a first end of the seventh transistor electrically connects with a first end of the ninth transistor to receive the internal control signals, a third end of the eighth transistor respectively connects with a second end of the ninth transistor, a first end of the tenth transistor, and a first end of the eleventh transistor, a second end of the tenth transistor electrically connects with the scanning signals at the N-th level, a second end of the eleventh transistor electrically connects with the gate signals point at the N-th level, a third end of the seventh transistor and a third end of the eleventh transistor electrically connects with the first low level signals, a third end of ninth transistor and a third end of the tenth transistor electrically connect with the second low level signals.

5. The GOA circuit according to claim 4, wherein the controlling module comprises a twelfth transistor, wherein a first end of the twelfth transistor electrically connects with the gate signals point at the N-th level after connecting with a gate of the twelfth transistor of the GOA unit adjacent to the twelfth transistor, a second end of the twelfth transistor electrically connects with a third end of the sixth transistor, a third end of the twelfth transistor electrically connects with the first low level signals, wherein
an absolute value of the first low level signals is greater than an absolute value of the second low level signals.

6. The GOA circuit according to claim 5, wherein the circuit comprises two pull-down maintaining modules and two controlling modules, one of the external controlling signals of the two pull-down maintaining module are configured to be first low frequency signals, the other one of the external controlling signals of the two pull-down maintaining module are configured to be second low frequency signals.

7. The GOA circuit according to claim 4, wherein the pull-down maintaining module further comprises a thirteenth transistor and a fourteenth transistor;
wherein the thirteenth transistor electrically connects with a first end of the fourteenth transistor, a second end of the thirteenth transistor electrically connects with the gate signals point at the N-th level, a second end of the fourteenth transistor electrically connects with the second end of the tenth transistor, the thirteenth transistor and a third end of the fourteenth transistor electrically connect the first low level signals or the second low level signals; and
the first low level signals electrically connect with the second low level signals.

8. The GOA circuit according to claim 7, wherein the controlling module comprises a first connecting line and a second connecting line;
one end of the first controlling line connects with the first end of the tenth transistor in the pull-down maintaining module, the other end of the first controlling line connects with the first end of the fourteenth transistor within the adjacent GOA unit;

one end of the second connecting line connects with the first end of the thirteenth transistor in the pull-down maintaining module, the other end of the second controlling line connects with the first end of the eleventh transistor within the adjacent GOA unit.

9. The GOA circuit according to claim 3, wherein the pull-up controlling module comprises a first transistor, wherein a first end of the first transistor is configured to receive the level-transfer signals at the (N−2)-th level, a second end of the first transistor is configured to receive the scanning signals at the (N−2)-th level, a third end of the first transistor electrically connects with the gate signals point at the N-th level, and the third end of the first transistor is configured to transmit the internal controlling signals to the gate signals point at the N-th level.

10. The GOA circuit according to claim 3, wherein the pull-up module comprises a third transistor, the down-transfer module comprises a second transistor, and the bootstrap capacitor module comprises a capacitor;

the second transistor is configured to receive the internal control signals after connecting with a first end of the third transistor, and the second transistor is configured to receive the clock signals after connecting with a second end of the third transistor, a third end of the second transistor is configured to output the level-transfer signals and connects with the scanning signals at the N-th level;

two sides of the capacitor electrically connect with the first end of the second transistor and the third end of the third transistor.

11. The GOA circuit according to claim 3, wherein the pull-down module comprises a fourth transistor and a fifth transistor;

the fourth transistor is configured to receive the scanning signals at (N+2)-th level after electrically connecting with a first end of the fifth transistor, a second end of the fourth transistor is configured to receive internal controlling signals, a second end of the fifth transistor connects with scanning signals at the N-th level, a third end of the fourth transistor electrically connects with first low level signals, and a third end of the fifth transistor electrically connects with second low level signals.

12. A LCD, comprising: a GOA circuit configured with a plurality of cascaded-connected GOA units, wherein the GOA unit at a N-th level comprises: a pull-up controlling module, a pull-up module, a down-transfer module, a bootstrap capacitor module, a pull-down maintaining module, a pull-down module and a controlling module;

wherein the pull-up controlling module is configured to receive level-transfer signals and scanning signals at a (N−2)-th level, and to output internal control signals at a gate signals point at the N-th level according to the level-transfer signals and the scanning signals at the (N−2)-th level;

the pull-up module is configured to receive the internal control signals and clock signals, and to pull up the scanning signals at the N-th level according to the internal control signals and the clock signals;

the down-transfer module is configured to receive the internal control signals and the clock signals, and to output the level-transfer signals at the N-th level according to the internal control signals and the clock signals;

the bootstrap capacitor module is configured to pull up a high potential of the internal control signals;

the pull-down maintaining module is configured to receive the internal control signals, external control signals, first low level signals, and second low level signals, and to maintain a low level of the scanning signals at the N-th level according to the internal control signals, the external control signals, the first low level signals, and the second low level signals;

the pull-down module is configured to receive the internal control signals, the first low level signals, the second low level signals, and scanning signals at (N+2)-th level, and to pull down the scanning signals at the N-th level according to the internal control signals, the first low level signals, the second low level signals, and the scanning signals at (N+2)-th level;

the controlling module connects with the pull-down maintaining module and the adjacent GOA unit respectively, and the controlling module is configured to accelerate a pull-down speed of the pull-down maintaining module by increasing a discharge path of the pull-down maintaining module via the adjacent GOA unit.

13. The LCD according to claim 12, wherein the pull-down maintaining module comprises: a sixth transistor, a seventh transistor, an eighth transistor, a ninth transistor, a tenth transistor, and an eleventh transistor;

wherein a first end and a second end of the sixth transistor electrically connect with a second end of the eighth transistor to receive the external control signals, a third end of the sixth transistor electrically connects with a second end of the seventh transistor and a first end of the eighth transistor respectively, a first end of the seventh transistor electrically connects with a first end of the ninth transistor to receive the internal control signals, a third end of the eighth transistor respectively connects with a second end of the ninth transistor, a first end of the tenth transistor, and a first end of the eleventh transistor, a second end of the tenth transistor electrically connects with the scanning signals at the N-th level, a second end of the eleventh transistor electrically connects with the gate signals point at the N-th level, a third end of the seventh transistor and a third end of the eleventh transistor electrically connects with the first low level signals, a third end of ninth transistor and a third end of the tenth transistor electrically connect with the second low level signals.

14. The LCD according to claim 13, wherein the controlling module comprises a twelfth transistor, wherein a first end of the twelfth transistor electrically connects with the gate signals point at the N-th level after connecting with a gate of the twelfth transistor of the GOA unit adjacent to the twelfth transistor, a second end of the twelfth transistor electrically connects with a third end of the sixth transistor, a third end of the twelfth transistor electrically connects with the first low level signals, wherein an absolute value of the first low level signals is greater than an absolute value of the second low level signals.

15. The LCD according to claim 14, wherein the circuit comprises two pull-down maintaining modules and two controlling modules, one of the external controlling signals of the two pull-down maintaining module are configured to be first low frequency signals, the other one of the external controlling signals of the two pull-down maintaining module are configured to be second low frequency signals.

16. The LCD according to claim 13, wherein the pull-down maintaining module further comprises a thirteenth transistor and a fourteenth transistor;

wherein the thirteenth transistor electrically connects with a first end of the fourteenth transistor, a second end of the thirteenth transistor electrically connects with the gate signals point at the N-th level, a second end of the fourteenth transistor electrically connects with the second end of the tenth transistor, the thirteenth transistor and a third end of the fourteenth transistor electrically connect the first low level signals or the second low level signals; and the first low level signals electrically connect with the second low level signals.

17. The LCD according to claim 16, wherein the controlling module comprises a first connecting line and a second connecting line;

one end of the first controlling line connects with the first end of the tenth transistor in the pull-down maintaining module, the other end of the first controlling line connects with the first end of the fourteenth transistor within the adjacent GOA unit;

one end of the second connecting line connects with the first end of the thirteenth transistor in the pull-down maintaining module, the other end of the second controlling line connects with the first end of the eleventh transistor within the adjacent GOA unit.

18. The LCD according to claim 12, wherein the pull-up controlling module comprises a first transistor, wherein a first end of the first transistor is configured to receive the level-transfer signals at the (N−2)-th level, a second end of the first transistor is configured to receive the scanning signals at the (N−2)-th level, a third end of the first transistor electrically connects with the gate signals point at the N-th level, and the third end of the first transistor is configured to transmit the internal controlling signals to the gate signals point at the N-th level.

19. The LCD according to claim 12, wherein the pull-up module comprises a third transistor, the down-transfer module comprises a second transistor, and the bootstrap capacitor module comprises a capacitor;

the second transistor is configured to receive the internal control signals after connecting with a first end of the third transistor, and the second transistor is configured to receive the clock signals after connecting with a second end of the third transistor, a third end of the second transistor is configured to output the level-transfer signals and connects with the scanning signals at the N-th level;

two sides of the capacitor electrically connect with the first end of the second transistor and the third end of the third transistor.

20. The LCD according to claim 12, wherein the pull-down module comprises a fourth transistor and a fifth transistor;

the fourth transistor is configured to receive the scanning signals at (N+2)-th level after electrically connecting with a first end of the fifth transistor, a second end of the fourth transistor is configured to receive internal controlling signals, a second end of the fifth transistor connects with scanning signals at the N-th level, a third end of the fourth transistor electrically connects with first low level signals, and a third end of the fifth transistor electrically connects with second low level signals.

* * * * *